(12) United States Patent
Koiwai et al.

(10) Patent No.: US 12,454,924 B2
(45) Date of Patent: Oct. 28, 2025

(54) CONTROL DEVICE FOR INTERNAL COMBUSTION ENGINE AND CONTROL METHOD FOR INTERNAL COMBUSTION ENGINE

(71) Applicant: Hitachi Astemo, Ltd., Hitachinaka (JP)

(72) Inventors: Ryutaro Koiwai, Hitachinaka (JP);
Osamu Mukaihara, Hitachinaka (JP);
Kazuhiro Oryoji, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/853,922

(22) PCT Filed: Jun. 24, 2022

(86) PCT No.: PCT/JP2022/025290
§ 371 (c)(1),
(2) Date: Oct. 3, 2024

(87) PCT Pub. No.: WO2023/248462
PCT Pub. Date: Dec. 28, 2023

(65) Prior Publication Data
US 2025/0230776 A1 Jul. 17, 2025

(51) Int. Cl.
*F02D 41/14* (2006.01)
*F02D 41/18* (2006.01)

(52) U.S. Cl.
CPC ....... *F02D 41/182* (2013.01); *F02D 41/1401* (2013.01); *F02D 2041/1433* (2013.01);
(Continued)

(58) Field of Classification Search
CPC ............... F02D 41/182; F02D 41/1401; F02D 2041/1433; F02D 2200/0408; F02D 2200/0416
See application file for complete search history.

(56) References Cited

U.S. PATENT DOCUMENTS 8,473,182 B2   6/2013   Suzuki et al.
2012/0290193 A1  11/2012   Suzuki et al.
(Continued)

FOREIGN PATENT DOCUMENTS

JP   2011-127454 A   6/2011

OTHER PUBLICATIONS

International Search Report (PCT/ISA/210) issued in PCT Application No. PCT/JP2022/025290 dated Sep. 13, 2022 with English translation (8 pages).
(Continued)

*Primary Examiner* — Grant Moubry
(74) *Attorney, Agent, or Firm* — Crowell & Moring LLP

(57) ABSTRACT

An intake air flow rate into an intake passage is detected with an internal combustion engine as a control device, and atmospheric pressure and temperature are estimated or detected. An intake passage internal average pressure and an intake passage internal average temperature in a region up to a throttle valve of the intake passage as one region are estimated. Distributions of a pressure and a temperature inside the intake passage are estimated based on the estimated intake passage internal average pressure, the intake passage internal average temperature, and a model of energy change caused by a constituent element included in the intake passage.

15 Claims, 9 Drawing Sheets

(52) U.S. Cl.
CPC ............... *F02D 2200/0408* (2013.01); *F02D 2200/0416* (2013.01)

(56) References Cited

U.S. PATENT DOCUMENTS

| | | | | |
|---|---|---|---|---|
| 2017/0145933 A1* | 5/2017 | Dudar | .................. | B60W 20/15 |
| 2017/0335748 A1* | 11/2017 | Zhang | ...................... | F01P 7/16 |
| 2021/0095610 A1* | 4/2021 | Hashimoto | ............... | F01P 3/02 |

OTHER PUBLICATIONS

Japanese-language Written Opinion (PCT/ISA/237) issued in PCT Application No. PCT/JP2022/025290 dated Sep. 13, 2022 with English translation (7 pages).

\* cited by examiner

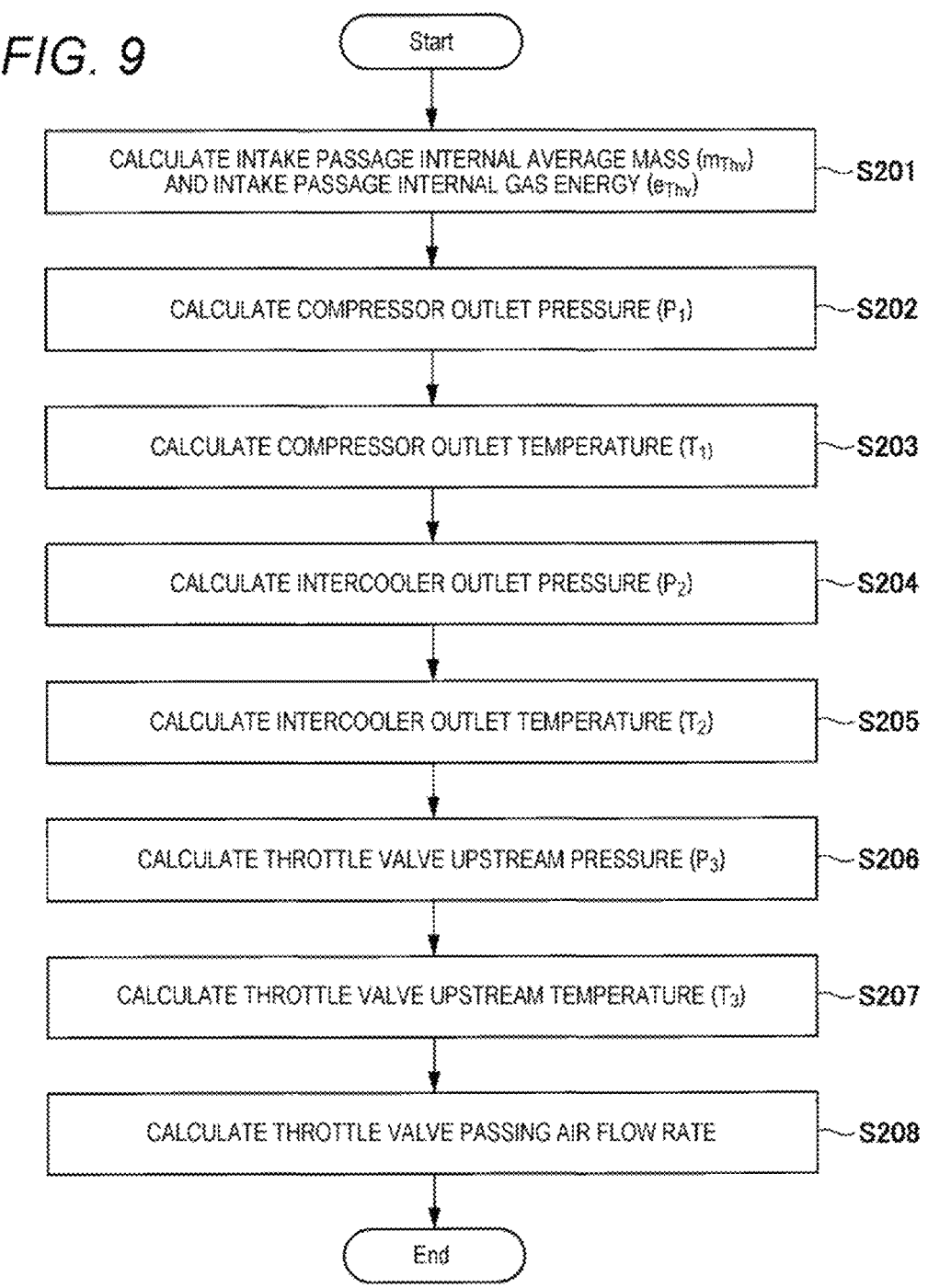

CONTROL DEVICE FOR INTERNAL COMBUSTION ENGINE AND CONTROL METHOD FOR INTERNAL COMBUSTION ENGINE

TECHNICAL FIELD

The present invention relates to a control device for an internal combustion engine and a control method for an internal combustion engine.

BACKGROUND ART

Vehicle emissions control is increasingly stringent year by year for environmental load reduction, and requires an increased accuracy of air-fuel ratio control, which is a technique of controlling the air-fuel ratio, which is the ratio of the air quantity to the fuel quantity in a cylinder, to an appropriate state.

Methods of air-fuel ratio control include a method of detecting the oxygen concentration in an exhaust gas and correcting the fuel supply amount, and a method of determining the fuel supply amount depending on an intake flow rate detected by an intake flow rate sensor included in an intake path.

These methods are easily applied in a steady state in which there is no large change in the rotational speed and output of the internal combustion engine. On the other hand, under transient operation conditions such as rapid acceleration and rapid deceleration of an automobile, these methods cannot capture the gas flow rate flowing into the cylinder that is transiently changing, and therefore the air-fuel ratio cannot be set sufficiently quickly to an appropriate condition. Note that in the following description, the gas flow rate flowing into a cylinder is called an in-cylinder inflow air flow rate.

Therefore, under the condition in which the operation of the internal combustion engine is in a transient state, it is necessary to calculate the in-cylinder inflow air flow rate using in-cylinder inflow air flow rate estimation control, and appropriately set the fuel injection quantity so as to obtain a target air-fuel ratio. Calculation methods of the in-cylinder inflow air flow rate of the internal combustion engine include a method of calculating an intake pipe pressure from a throttle valve passing flow rate calculated based on the intake flow rate and an effective opening area of a throttle valve, and calculating the in-cylinder inflow air flow rate from the calculated intake pipe pressure. Note that in the following description, the effective opening area of a throttle valve is called a throttle valve effective opening area.

PTL 1 describes a technique of estimating an entirely averaged pressure and a temperature in an intake passage and estimating a throttle valve passing flow rate based on the estimated average pressure.

CITATION LIST

Patent Literature

PTL 1: JP 2011-127454 A

SUMMARY OF INVENTION

Technical Problem

As described in PTL 1, in a case of estimating the pressure and the temperature averaged in the entire intake passage, it is not possible to correctly grasp the gas flow rate flowing into a transiently changing cylinder in a transient operation state such as at the time of rapid acceleration or deceleration of the automobile. Therefore, the conventional technique has a problem that the air-fuel ratio cannot be quickly set to an appropriate condition during transient operation.

For this reason, it has been desired to achieve a control device for an internal combustion engine and a control method for an internal combustion engine that can quickly set the air-fuel ratio to an appropriate condition even in a transient operation state.

Solution to Problem

In order to solve the above-described problem, for example, the configuration described in the claims is adopted. The present application includes a plurality of means for solving the above-described problem, and examples thereof include a control device for an internal combustion engine, including: an intake air flow rate acquisition unit that detects an intake air flow rate into an intake passage; an atmospheric pressure acquisition unit that estimates or detects a pressure of atmosphere; an atmospheric temperature acquisition unit that estimates or detects a temperature of atmosphere; an intake passage internal average pressure estimation unit that estimates an intake passage internal average pressure; an intake passage internal average temperature estimation unit that estimates an intake passage internal average temperature; and a spatial distribution estimation unit that estimates distributions of pressure and temperature inside the intake passage based on an intake passage internal average pressure estimated by the intake passage internal average pressure estimation unit, an intake passage internal average temperature estimated by the intake passage internal average temperature estimation unit, and a model of energy change caused by a constituent element included in the intake passage.

Advantageous Effects of Invention

According to the present invention, a throttle valve passing flow rate can be accurately estimated by estimating a throttle valve passing flow rate based on an estimated pressure and temperature on a throttle valve upstream. Therefore, an estimation error of an in-cylinder inflow air flow rate can be reduced, and the air-fuel ratio of an internal combustion engine can be quickly set to an appropriate condition.

Problems, configurations, and effects other than those described above will be clarified by the following description of embodiments.

BRIEF DESCRIPTION OF DRAWINGS

FIG. 9 is a flowchart showing an example of control processing of the control device for an internal combustion engine according to the second embodiment of the present invention.

DESCRIPTION OF EMBODIMENTS

Hereinafter, embodiments of the present invention will be described in order. Each of the embodiments described below shows a preferred example. The present invention is not limited to each of the embodiments described below, and can be implemented by appropriately adding, changing, deleting, or the like a configuration of each unit without departing from the gist of the present invention.

First Embodiment

Hereinafter, the control device for an internal combustion engine according to the first embodiment of the present invention will be described with reference to FIGS. 1 to 6.

[Configuration of Engine]

Figure 1:
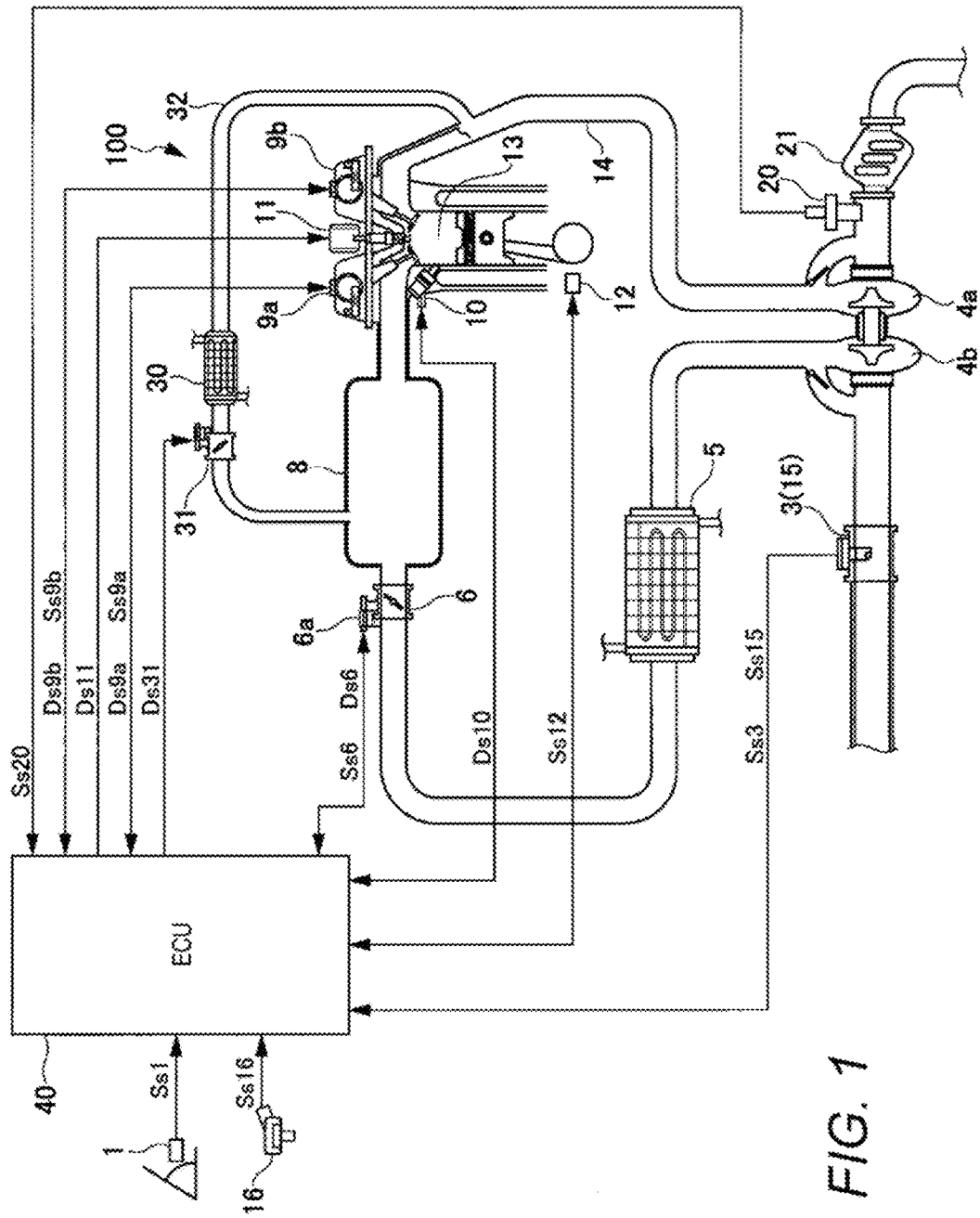
FIG. 1 is a view illustrating a configuration of a system including a control device for an internal combustion engine according to a first embodiment of the present invention.

FIG. 1 is a configuration diagram illustrating a main part of an engine 100, which is an internal combustion engine controlled by the control device for an internal combustion engine according to the first embodiment.

The engine 100 illustrated in FIG. 1 is a spark ignition type internal combustion engine. The engine 100 includes, at appropriate positions of an intake pipe 8, an intake flow rate sensor (airflow sensor) 3 that measures an intake flow rate passing through an intake passage, a compressor 4b of a supercharger that compresses an intake gas, an intercooler 5 that cools the intake gas, and a throttle valve 6 that adjusts the intake flow rate. Note that the intake passage mentioned here is from the intake flow rate sensor 3 to the throttle valve 6, and a location from the throttle valve 6 to a combustion chamber 13 is called an intake pipe.

The intake flow rate sensor 3 incorporates an intake temperature sensor 15 that detects an intake air temperature. The throttle valve 6 incorporates a throttle position sensor 6a that detects an opening degree of the throttle valve 6.

The engine 100 has, disposed therein, a variable intake valve 9a that controls an opening/closing phase of an intake valve, a variable exhaust valve 9b that controls an opening/closing phase of an exhaust valve, a fuel injection device 10 that injects fuel into the combustion chamber 13, an ignition plug 11 that supplies ignition energy, a crank angle sensor 12, and an atmospheric pressure sensor 16 that measures an atmospheric pressure. Note that regarding the pressure sensor, a sensor (not illustrated) that detects the pressure at a downstream of the throttle valve is also provided.

Each of the variable intake valve 9a and the variable exhaust valve 9b is provided with a phase sensor that detects an opening/closing phase.

Furthermore, an exhaust pipe 14 has, disposed therein, a turbine 4a that drives the compressor 4b using the energy of exhaust gas, a catalyst converter 21 that purifies the exhaust gas, and an air-fuel ratio sensor 20 that is an aspect of an air-fuel ratio detector and detects an air-fuel ratio of an exhaust gas on an upstream side of the catalyst converter 21. The air-fuel ratio sensor 20 may be an oxygen concentration sensor.

An exhaust gas recirculation (EGR) pipe 32 for extracting EGR from the upstream of the compressor 4b branches from the exhaust pipe 14. An EGR cooler 30 for cooling EGR and an EGR valve 31 for adjusting an EGR flow rate are disposed in this EGR pipe 32.

An engine control unit (hereinafter, called ECU) 40 is supplied with detection signals Ss1, Ss3, Ss6, Ss9a, Ss9b, Ss12, Ss15, Ss16, and Ss20.

The detection signal Ss1 is a detection signal obtained from an accelerator opening degree sensor 1, and is a detection signal of a depression amount of an accelerator pedal, that is, an accelerator opening degree.

The detection signal Ss3 is a detection signal of the intake flow rate obtained from the intake flow rate sensor 3.

The detection signal Ss6 is a detection signal of a throttle valve opening degree obtained from the throttle position sensor 6a.

The detection signal Ss9a is an opening/closing phase detection signal of an intake valve obtained from the phase sensor of the variable intake valve 9a.

The detection signal Ss9b is an opening/closing phase detection signal of an intake valve obtained from the phase sensor of the variable exhaust valve 9b.

The detection signal Ss12 is a detection signal of a rotational speed obtained from the crank angle sensor 12.

The detection signal Ss15 is a detection signal of an atmospheric temperature obtained from the intake temperature sensor 15.

The detection signal Ss16 is a detection signal of an atmospheric pressure obtained from the atmospheric pressure sensor 16.

The detection signal Ss20 is a detection signal obtained from the air-fuel ratio sensor 20.

Note that the ECU 40 is also supplied with a detection signal of a sensor (not illustrated) that detects a pressure at the intake passage of a downstream of the throttle valve.

The ECU 40 calculates required torque based on the detection signal Ss1 of the accelerator opening degree sensor 1 and various sensor signals. That is, the accelerator opening degree sensor 1 is used as a required torque detection sensor that detects required torque to the engine 100. Based on an operation state of the engine 100 obtained from outputs of various sensors, the ECU 40 optimally calculates main operation amounts of the engine 100 such as an opening degree of the throttle valve 6, an injection pulse period of the fuel injection device 10, an ignition timing of the ignition plug 11, opening/closing timings of the intake valve 9a and the exhaust valve 9b, and an opening degree of the EGR valve 31.

The fuel injection pulse period calculated by the ECU 40 is converted into a fuel injection device opening valve pulse signal (fuel injection device drive signal) Ds10 and sent to the fuel injection device 10. The opening degree of the throttle valve 6 calculated by the ECU 40 is sent to the throttle valve 6 as a throttle valve drive signal Ds6. Similarly, an ignition plug drive signal Ds11 is sent to the ignition plug 11. An EGR valve drive signal Ds31, which is a signal of the opening degree of the EGR valve, is sent to the EGR valve 31.

A fuel injected from the fuel injection device 10 is mixed with the air flowing into the combustion chamber 13 from the intake pipe 8 through the intake valve 9a, and an air-fuel mixture is formed. The fuel is supplied the fuel injection device 10 from a fuel tank via a fuel tank fuel pump. In FIG. 1, illustration of the fuel tank and the fuel tank fuel pump is omitted.

The air-fuel mixture is combusted by a spark generated from the ignition plug 11 at a predetermined ignition timing, and the combustion pressure pushes down the piston to become a drive force of the engine 100. The exhaust gas after combustion is sent to the catalyst converter 21 via the exhaust valve 9b, the exhaust pipe 14, and the turbine 4a, and is discharged after NOx, CO, and HC components are purified. Part of the exhaust gas is introduced into the intake pipe 8 via the EGR pipe 32, the EGR cooler 30, and the EGR valve 31.

[Configuration of ECU]

Figure 2:
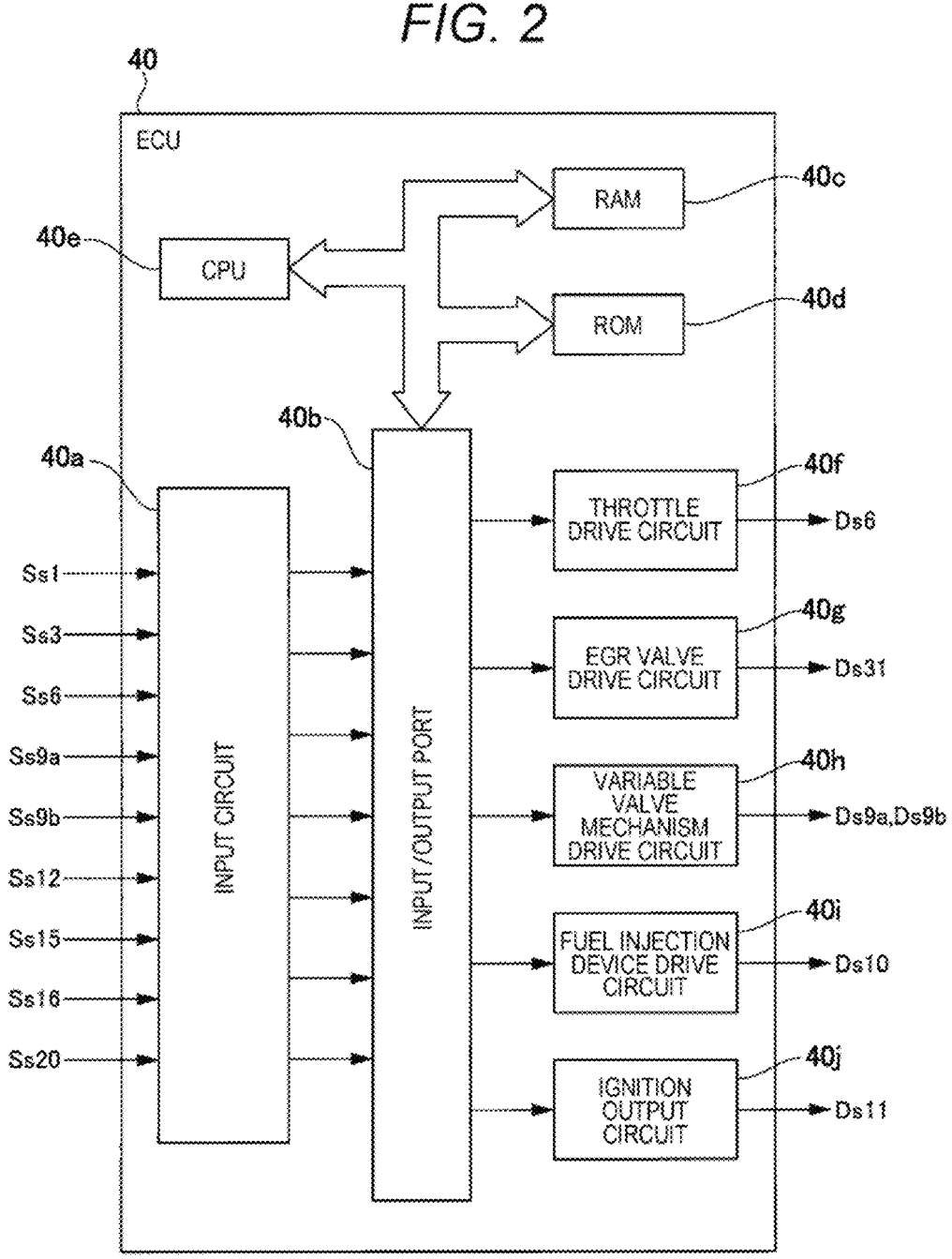
FIG. 2 is a block diagram illustrating a configuration of the control device for an internal combustion engine according to the first embodiment of the present invention.

FIG. 2 illustrates the configuration of the ECU 40.

The detection signals Ss1, Ss3, Ss6, Ss9a, Ss9b, Ss12, Ss15, Ss16, and Ss20 illustrated in FIG. 1 are supplied to an input circuit 40a of the ECU 40. That is, the input circuit 40a is supplied with the detection signal Ss1 of the accelerator opening degree sensor 1, the detection signal Ss3 of the intake flow rate sensor 3, the detection signal Ss6 of the throttle valve opening degree, and the detection signals Ss9a and Ss9b of the phase sensors of the intake valve 9a and the exhaust valve 9b. The input circuit 40a is supplied with the detection signal Ss12 of the crank angle sensor 12, the detection signal Ss15 of the intake temperature sensor 15, the detection signal Ss16 of the atmospheric pressure sensor 16, and the detection signal Ss20 of the air-fuel ratio sensor 20.

Therefore, the input circuit 40a of the ECU 40 functions as an acquisition unit of these signals. That is, the input circuit 40a functions as an intake air flow rate acquisition unit that acquires the detection signal Ss3 of the intake air flow rate, an atmospheric pressure acquisition unit that detects the atmospheric pressure, and an atmospheric temperature acquisition unit that detects the atmospheric temperature.

However, input signals to the ECU 40 are not limited to these signals. The signals such as the atmospheric pressure and the atmospheric temperature acquired by the input circuit 40a may be values estimated by calculation or the like in place of the detection values of the sensors.

The input signal from each sensor input to the input circuit 40a of the ECU 40 is sent to an input port in an input/output port 40b. The value of the input signal sent to the input/output port 40b is stored in a random access memory (RAM) 40c and is subjected to calculation processing by a central processing unit (CPU) 40e. At this time, among the input signals sent to the input circuit 40a, a signal including an analog signal is converted into a digital signal by an analog/digital converter (not illustrated) provided in the input circuit 40a.

A control program describing calculation processing content executed by the CPU 40e is written in advance in a read only memory (ROM) 40d. The values indicating the operation amounts of actuators calculated by the CPU 40e in accordance with the control program are stored in the RAM 40c, then sent to an output port of the input/output port 40b, and sent to the actuators via respective drive circuits.

In the case of the present embodiment, the ECU 40 includes, as drive circuits, a throttle drive circuit 40f, an EGR valve drive circuit 40g, a variable valve mechanism drive circuit 40h, a fuel injection device drive circuit 40i, and an ignition output circuit 40j.

The throttle drive circuit 40f generates a control signal Ds6 of the throttle valve 6.

The EGR valve drive circuit 40g generates a control signal Ds31 of the EGR valve 31.

The variable valve mechanism drive circuit 40h generates a control signal Ds9 of the variable valve 9.

The fuel injection device drive circuit 40i generates a control signal Ds10 of the fuel injection device 10.

The ignition output circuit 40j generates the drive signal Ds11 of the ignition plug 11.

Note that while the ECU 40 of the present embodiment is configured to internally include the drive circuits, the present invention is not limited to this, and for example, any or all of the drive circuits illustrated in FIG. 2 may be provided outside the ECU 40.

[Configuration for Performing Control Processing by ECU]

Figure 3:
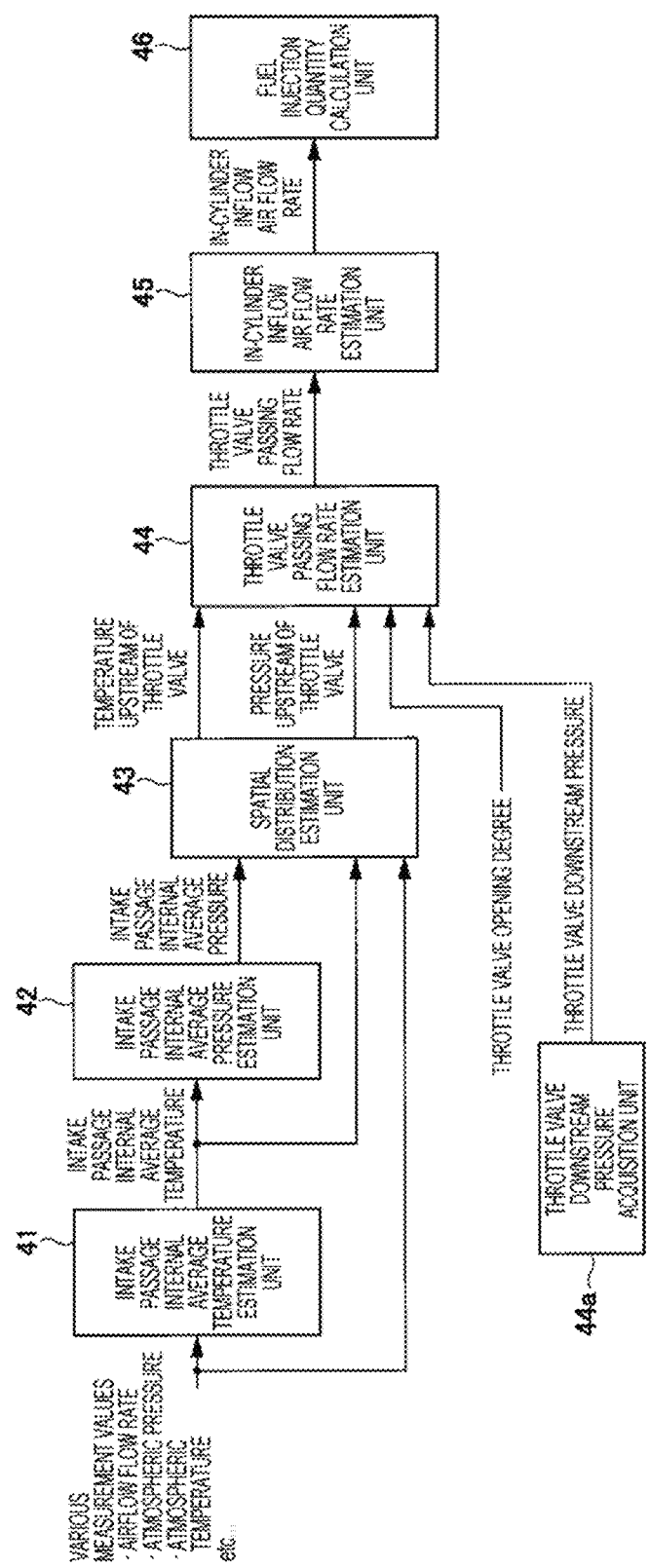
FIG. 3 is a functional block diagram of the control device for an internal combustion engine according to the first embodiment of the present invention.

FIG. 3 illustrates a functional configuration for performing control processing of the engine 100 by the ECU 40 of the present embodiment. The processing units illustrated in FIG. 3 are configured in a work memory in the CPU 40e by execution of a control program mounted on the ECU 40.

As illustrated in FIG. 3, the ECU 40 includes an intake passage internal average temperature estimation unit 41, an intake passage internal average pressure estimation unit 42, a spatial distribution estimation unit 43, a throttle valve passing flow rate estimation unit 44, an in-cylinder inflow air flow rate estimation unit 45, and a fuel injection quantity calculation unit 46.

The intake passage internal average temperature estimation unit 41 is supplied with the detection signal Ss3 of the intake flow rate, the detection signal Ss16 of the atmospheric pressure, the detection signal Ss15 of the atmospheric temperature, and the like. The detection signal Ss16 of the atmospheric pressure is obtained by atmospheric pressure acquisition processing. The detection signal Ss15 of the atmospheric temperature is obtained by atmospheric temperature acquisition processing. The atmospheric pressure and the atmospheric temperature may be estimate values in place of detection values of the sensors. The intake passage internal average temperature estimation unit 41 performs intake passage internal average temperature estimation processing based on these detection signals and estimates the average temperature in the intake passage. The average temperature in the intake passage estimated by the intake passage internal average temperature estimation unit 41 is supplied to the intake passage internal average pressure estimation unit 42 and the spatial distribution estimation unit 43.

The intake passage internal average pressure estimation unit 42 performs intake passage internal average pressure estimation processing based on the average temperature in the intake passage supplied with the average temperature and estimates the average pressure in the intake passage. The average pressure in the intake passage estimated by the intake passage internal average pressure estimation unit 42 is supplied to the spatial distribution estimation unit 43.

Here, the principle of estimation of the intake passage internal average temperature by the intake passage internal average temperature estimation unit 41 and estimation of the intake passage internal average pressure by the intake passage internal average pressure estimation unit 42 will be described.

First, the path from an intake port to the engine is divided into three control volumes (CV) of between the intake port and the throttle valve (hereinafter, this location is called intake passage), between the throttle valve and an intake location of the combustion chamber, and an exhaust pipe connected to the combustion chamber. Here, the mass and the energy of the gas in each CV, and the mass flow rate and the energy flow rate passing through each CV are calculated. In the calculation, the pressure and the temperature are calculated from the mass and the energy of each CV based on the following basic mathematical formulae [Mathematical Formula 1] to [Mathematical Formula 4] using an intake flow rate detection value, an intake temperature detection value, an atmospheric pressure detection value, a throttle valve opening degree detection value, an EGR valve opening detection value, an intake valve phase detection value, an exhaust valve phase detection value, a rotational speed detection value, a cooling water temperature detection value, torque, and the mass flow rate and the temperature calculated at the previous calculation time.

$$\frac{dm}{dt} = \frac{dm_{in}}{dt} + \frac{dm_{out}}{dt} \qquad \text{[Mathematical Formula 1]}$$

$$\frac{dm \cdot e}{dt} = \qquad \text{[Mathematical Formula 2]}$$

$$\frac{\kappa_{in} R_{in}}{\kappa_{in} - 1} T_{in} \cdot \frac{dm_{in}}{dt} - \frac{\kappa_{out} R_{out}}{\kappa_{out} - 1} T_{out} \cdot \frac{dm_{out}}{dt} - \frac{dQ}{dt}$$

$$P = \frac{m}{V} RT \qquad \text{[Mathematical Formula 3]}$$

$$T = \frac{\kappa - 1}{R} e \qquad \text{[Mathematical Formula 4]}$$

Here, m represents mass [kg], e represents energy [J], T represents temperature [K], κ represents specific heat ratio, R represents gas constant [J/(kg·K)], Q represents heat transfer amount (wall surface heat loss amount) [J] to a wall surface with which a gas is in contact, V represents volume [m³], an index in represents inflow to a CV, and an index out represents outflow from a CV.

With [Mathematical Formula 1] to [Mathematical Formula 4] as the basic principle, the intake passage internal average temperature estimation unit 41 and the intake passage internal average pressure estimation unit 42 perform the following calculation.

An intake passage internal mass $m_{Thr}$ is calculated by [Mathematical Formula 5], which is a mathematical formula in which [Mathematical Formula 1] is discretized based on an intake flow rate $d_{GAFS}$, a previous value of a throttle valve passing flow rate $dG_{Thr}$ (described later), and a previous value of an intake passage internal mass. In the following mathematical formula, a processing value at a current time step is indicated by n, and a previous value is indicated by n−1.

$$m_{Thr}(n) = \qquad \text{[Mathematical Formula 5]}$$

$$(dG_{AFS}(n) - dG_{Thr}(n-1)) \times dt + m_{Thr}(n-1)$$

An intake passage internal energy $e_{Thr}$ is calculated by [Mathematical Formula 6], which is a mathematical formula in which [Mathematical Formula 2] is discretized based on the intake passage internal mass $m_{Thr}$, an atmospheric temperature $T_{atm}$, a previous value of an intake passage internal average temperature $T_{ave}$, the intake flow rate $dG_{AFS}$, and a previous value of the throttle valve passing flow rate $dG_{Thr}$.

$$e_{Thr}(n) = \qquad \text{[Mathematical Formula 6]}$$

$$\left(\frac{\kappa R}{\kappa - 1} T_0(n) \cdot dG_{AFS}(n) - \frac{\kappa R}{\kappa - 1} T_3(n-1) \cdot\right.$$

$$\left. dG_{Thr}(n-1) - \frac{dQ_c}{dt}\right) \times dt + \theta_{Thr}(n-1)$$

Here, for the specific heat ratio K and the gas constant R, values of air in a standard state are used as representative values. An intercooler cooling amount $dQ_c/dt$ is experimentally obtained in advance and given as a constant.

The intake passage internal average temperature estimation unit 41 calculates the intake passage internal average temperature by [Mathematical Formula 4] based on an intake passage internal energy.

The intake passage internal average pressure estimation unit 42 calculates the intake passage internal average pressure by [Mathematical Formula 3] based on a throttle valve upstream gas temperature and a throttle valve upstream gas mass.

The spatial distribution estimation unit 43 estimates distributions of the pressure and the temperature inside the upstream of the throttle valve of the intake passage based on the intake passage internal average pressure estimated by the intake passage internal average pressure estimation unit 42, the intake passage internal average temperature estimated by the intake passage internal average temperature estimation unit 41, and a model of energy change caused by a constituent element included in the intake passage. That is, the spatial distribution estimation unit 43 acquires a throttle valve upstream temperature distribution and a throttle valve upstream pressure distribution of the intake passage. The constituent element included in the intake passage mentioned here is a constituent element disposed in the intake passage that changes an energy state of the gas (intake air). The model of energy change indicates a model representing an energy change caused by a constituent element included in the intake passage.

Note that the spatial distribution estimation unit 43 acquires detection signals such as the detection signal Ss3 of the intake flow rate in order to obtain a model of energy change caused by a constituent element included in the intake passage. Details of processing in which the spatial distribution estimation unit 43 estimates the distributions of the pressure and the temperature inside the intake passage will be described later.

The distributions of the pressure and the temperature inside the upstream of the throttle valve of the intake passage estimated by the spatial distribution estimation unit 43 are supplied to the throttle valve passing flow rate estimation unit 44. The throttle valve passing flow rate estimation unit 44 is supplied with information on a throttle valve opening degree and a downstream pressure of the throttle valve.

The downstream pressure of the throttle valve is a value detected or estimated by a throttle valve downstream pressure acquisition unit 44a in the ECU 40. The downstream pressure of the throttle valve mentioned here is a pressure in a range from the throttle valve to the intake valve.

The throttle valve passing flow rate estimation unit 44 estimates the throttle valve passing flow rate based on the distributions of the pressure and the temperature inside the upstream of the throttle valve of the intake passage, the throttle valve opening degree, and the downstream pressure at the throttle valve. That is, regarding the throttle as an orifice, the throttle valve passing flow rate estimation unit 44 constructs a hydrodynamic model around the throttle, and calculates the throttle valve passing flow rate. Here, the throttle valve passing flow rate is given by the following mathematical formula of a flow rate in consideration of compressibility of a fluid based on the opening degree of the throttle valve and the pressure before and after the throttle valve.

[Mathematical Formula 7]

$$dG_{Thr} = \mu A p_3 \sqrt{\frac{2}{RT_3}} \cdot \Psi(p_3, p_{dn}) \quad (a)$$

$$\begin{cases} \Psi(p_3, p_{dn}) = \left(\frac{2}{\kappa+1}\right)^{1/\kappa-1} \sqrt{\frac{\kappa}{\kappa+1}} & (b) \\ \Psi(p_3, p_{dn}) = \sqrt{\frac{\kappa}{\kappa+1}\left\{\left(\frac{p_{dn}}{p_3}\right)^{2/\kappa} - \left(\frac{p_{dn}}{p_3}\right)^{(\kappa+1)/\kappa}\right\}} & (c) \end{cases}$$

$$\frac{p_{dn}}{p_3} < \left(\frac{2}{\kappa+1}\right)^{\kappa/\kappa-1}$$

$$\frac{p_{dn}}{p_3} \geq \left(\frac{2}{\kappa+1}\right)^{\kappa/\kappa-1}$$

In [Mathematical Formula 7], $dG_{Thr}$ is a throttle valve passing flow rate [kg/s], $\mu A$ is a throttle valve effective opening area [m$^2$], $P_3$ is a throttle valve upstream pressure [Pa], $P_{dn}$ is a throttle valve downstream pressure [Pa], R is a gas constant [J/(kg·K)], $T_3$ is a throttle valve upstream temperature [K], and $\Psi$ is a flow rate coefficient. Here, as the flow rate coefficient, any of mathematical formulae (b) and (c) of [Mathematical Formula 7] is selected in accordance with a pressure ratio $P_{dn}/P_3$ between the throttle valve upstream pressure $P_3$ and the throttle valve downstream pressure $P_{dn}$. A condition in which the ratio is smaller than the value indicated by [Mathematical Formula 8] is called a sonic condition, and the flow velocity passing through the valve becomes equal to the sound velocity and the flow rate is saturated, and therefore the flow rate coefficient is given as a constant not depending on the pressure state.

$$\left(\frac{2}{\kappa+1}\right)^{\kappa/\kappa-1} \quad \text{[Mathematical Formula 8]}$$

The throttle valve effective opening area is stored in advance in the ECU 40 as a table with the throttle valve opening degree as an axis.

The throttle valve passing flow rate estimated by the throttle valve passing flow rate estimation unit 44 is supplied to the in-cylinder inflow air flow rate estimation unit 45.

The in-cylinder inflow air flow rate estimation unit 45 performs intake air flow rate acquisition processing of estimating the air quantity flowing into the cylinder (combustion chamber 13) from the throttle valve passing flow rate. The in-cylinder inflow air quantity estimated by the in-cylinder inflow air flow rate estimation unit 45 is supplied to the fuel injection quantity calculation unit 46.

The fuel injection quantity calculation unit 46 calculates the fuel injection quantity based on the in-cylinder inflow air quantity, and generates the fuel injection device drive signal Ds10 corresponding to the calculated fuel injection quantity. The generated fuel injection device drive signal Ds10 is supplied to the fuel injection device 10. A mechanism of performing the estimation by the in-cylinder inflow air flow rate estimation unit 45 and the calculation by the fuel injection quantity calculation unit 46 will be described later ([Mathematical Formula 22] to [Mathematical Formula 24]).

[Control Processing by ECU]

Figure 4:
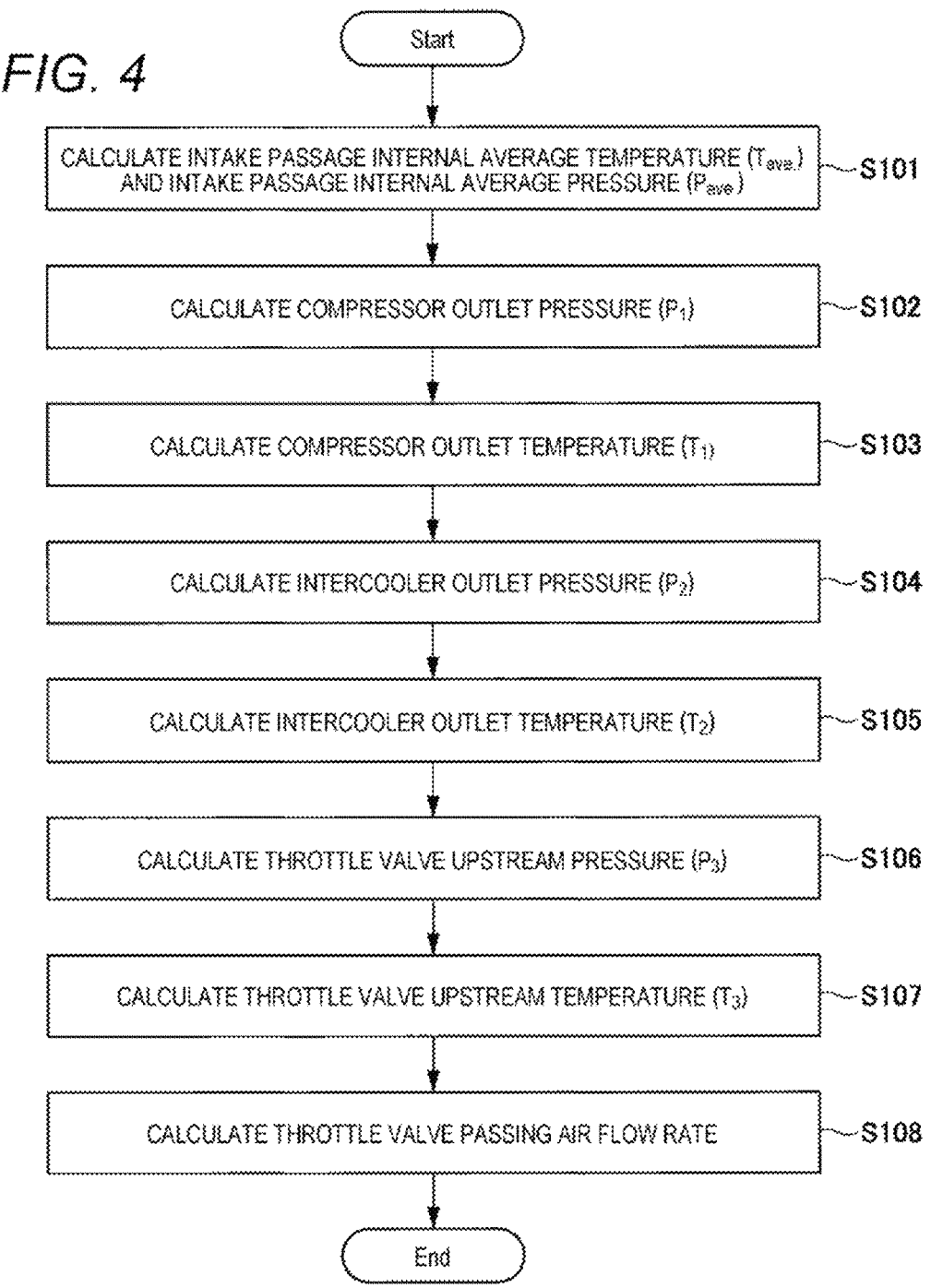
FIG. 4 is a flowchart showing an example of control processing of the control device for an internal combustion engine according to the first embodiment of the present invention.

FIG. 4 is a flowchart showing control processing of the engine 100 by the ECU 40 of the present embodiment.

First, the ECU 40 calculates the intake passage internal average temperature $T_{ave}$ and an intake passage internal average pressure $P_{ave}$ (step S101). The intake passage internal average temperature $T_{ave}$ and the intake passage internal average pressure $P_{ave}$ calculated here are a temperature and a pressure estimated based on the mass and the intake passage internal average temperature in the intake passage having the region up to the throttle valve as one region.

In step S101, the intake passage internal mass $m_{Thr}$ and the intake passage internal energy $e_{Thr}$ are calculated by performing the calculations using the [Mathematical Formula 5] and the [Mathematical Formula 6] described above. Then, the intake passage internal average temperature $T_{ave}$ is calculated from this intake passage internal energy $e_{Thr}$ by the calculation of [Mathematical Formula 9], and the intake passage internal average pressure $P_{ave}$ is calculated from the intake passage internal mass $m_{Thr}$ by the calculation of [Mathematical Formula 10].

$$T_{ave.}(n) = \frac{\kappa-1}{R} e_{Thr}(n) \quad \text{[Mathematical Formula 9]}$$

$$P_{ave.}(n) = \frac{m_{Thr}(n)}{\sum_{i=0}^{3} V_i} R\, T_{ave.}(n) \quad \text{[Mathematical Formula 10]}$$

Next, the ECU 40 calculates a compressor outlet pressure $P_1$ (step S102). Here, the compressor outlet pressure $P_1$ is obtained by the calculation of [Mathematical Formula 11] using the intake passage internal average temperature $T_{ave}$ and the intake passage internal average pressure $P_{ave}$ obtained in step S101. Note that $P_0$ is an atmospheric pressure sensor detection value, $V_i$ is a design value, and $T_i$ is a previous value of an estimate value.

$$P_1(n) = \frac{\dfrac{P_{ave.}(n)\sum_{i=0}^{3} V_i}{T_{ave.}(n)} - \dfrac{P_0(n)V_0}{T_0(n)}}{\sum_{i=0}^{3} \dfrac{V_i}{T_i(n-1)}} \quad \text{[Mathematical Formula 11]}$$

The ECU 40 calculates a compressor outlet temperature $T_1$ using the compressor outlet pressure $P_1$ (step S103). [Mathematical Formula 12] is a calculation mathematical formula for obtaining the compressor outlet temperature $T_1$ using the compressor outlet pressure $P_1$.

$$T_1(n) = \left\{1 + \frac{1}{\eta_c}\left[\left(\frac{P_1(n)}{P_0(n)}\right)^{\frac{\kappa-1}{\kappa}} - 1\right]\right\} T_0(n) \quad \text{[Mathematical Formula 12]}$$

The ECU 40 calculates an intercooler outlet pressure $P_2$ (step S104). [Mathematical Formula 13] is a calculation mathematical formula for obtaining the intercooler outlet pressure $P_2$ using the compressor outlet pressure $P_1$. $\Delta P_{IC}$ in [Mathematical Formula 13] is stored in the ECU 40 in advance as a table with a throttle valve passing flow rate $dG_{Thv}$ as an axis, and can be calculated based on a throttle valve passing flow rate $dG_{Thv}(n)$ at a current time point.

$$P_2(n) = P_1(n) - \Delta P_{IC}(n) \qquad \text{[Mathematical Formula 13]}$$

The ECU 40 calculates an intercooler outlet temperature $T_2$ (step S105). [Mathematical Formula 14] is a calculation mathematical formula for calculating the intercooler outlet temperature $T_2$. Coefficients a, b, and c shown in [Mathematical Formula 14] are calculated by [Mathematical Formula 15], [Mathematical Formula 16], and [Mathematical Formula 17]. Here, $P_2$ (n) and $P_3$ (n) are calculated as $P_1$ (n).

$$T_2(n) = \frac{-b + \sqrt{b^2 - 4ac}}{2a} \qquad \text{[Mathematical Formula 14]}$$

[Mathematical Formula 15]
$$a = P_0(n)V_0T_1(n) + P_1(n)V_1T_0(n) - $$
$$T_0(n)T_1(n)T_{ave.}(n)\sum_{i=0}^{3}P_i(n)V_i$$

[Mathematical Formula 16]
$$b = T_1(n)\Big(P_0(n)V_0T_1(n) + P_1(n)V_1T_0(n) + $$
$$2P_1(n)V_1T_0(n) + P_2(n)V_2T_0(n) - $$
$$T_0(n)T_1(n)/T_{ave.}(n)\sum_{i=0}^{3}P_i(n)V_i\Big)$$

$$P_2(n)V_2T_0(n)T_1^2(n) \qquad \text{[Mathematical Formula 17]}$$

Next, the ECU 40 calculates the throttle valve upstream pressure $P_3$ (step S106). [Mathematical Formula 18] is a calculation mathematical formula of the throttle valve upstream pressure $P_3$.

$$P_3(n) = P_2(n) - \Delta P_{Thv.}(n) \qquad \text{[Mathematical Formula 18]}$$

Here, $\Delta P_{Thv}$ represents a pressure loss in the pipe from the intercooler outlet to the throttle valve, is stored in the ECU 40 in advance as a table with the throttle valve passing flow rate $dG_{Thv}$ as an axis and can be calculated based on a previous value $dG_{Thv}(n-1)$ of the throttle valve passing flow rate.

Next, the ECU 40 calculates the throttle valve upstream temperature $T_3$ (step S107). Here, the intercooler outlet temperature $T_2$ obtained in step S105 is the throttle valve upstream temperature $T_3$. Note that the processing from step S102 to step S107 is executed by the spatial distribution estimation unit 43 of FIG. 3.

Thereafter, the ECU 40 calculates a throttle valve passing air flow rate (step S108). The calculation of the throttle valve passing air flow rate is performed by the processing described in [Mathematical Formula 7].

[Example of Distributions of Pressure and Temperature in Intake Passage]

Figure 5:
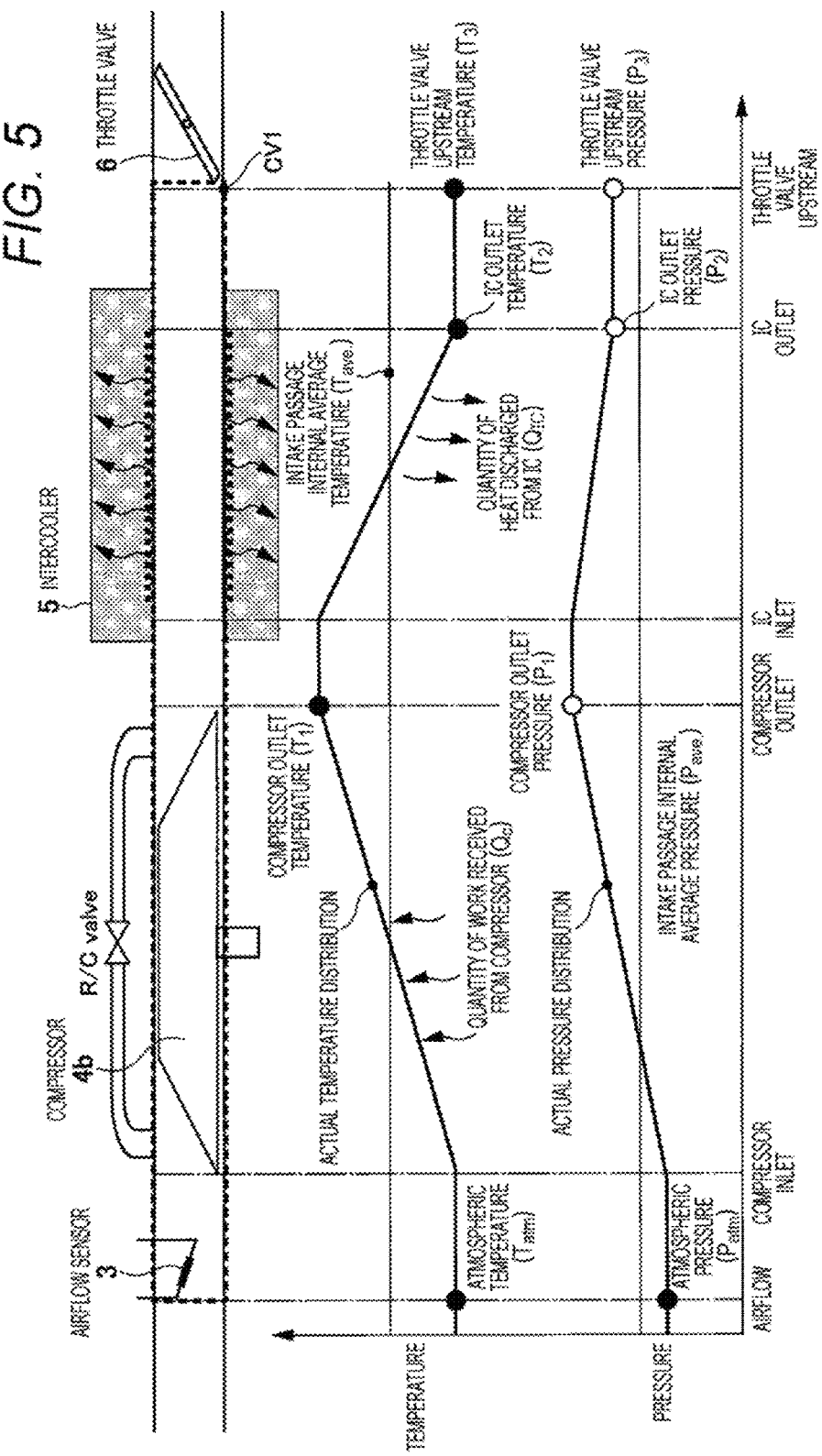
FIG. 5 is a view illustrating an example of distributions of a pressure and a temperature in an intake passage according to the first embodiment of the present invention.

FIG. 5 illustrates an example of the distributions of the pressure and the temperature from an airflow to the throttle valve upstream.

As illustrated on the upper side of FIG. 5, the intake flow rate sensor (airflow sensor) 3, the compressor 4b, the intercooler 5, and the throttle valve 6 are disposed in the intake passage in order from the left side, and FIG. 5 illustrates the distributions of the pressure and the temperature from the intake flow rate sensor 3 to the upstream of the throttle valve 6.

The pressure is an atmospheric pressure $P_{atm}$ at the location of the intake flow rate sensor 3, has a pressure distribution that gradually increases from the compressor inlet to the compressor outlet, and the compressor outlet pressure $P_1$ becomes the highest. Thereafter, the pressure becomes the pressure $P_2$ slightly decreasing at the outlet of the intercooler 5, and the outlet pressure $P_2$ of the intercooler 5 becomes the throttle valve upstream pressure $P_3$.

The average pressure $P_{ave}$ of the intake passage here is a value lower than the throttle valve upstream pressure $P_3$ and higher than the atmospheric pressure $P_{atm}$.

The temperature is the atmospheric temperature $T_{atm}$ at the location of the intake flow rate sensor 3, has a temperature distribution that gradually increases from the compressor inlet to the compressor outlet, and the compressor outlet temperature $T_1$ becomes the highest. Thereafter, the temperature becomes the temperature $T_2$ decreasing at the outlet of the intercooler 5, and the outlet temperature $T_2$ of the intercooler 5 becomes the throttle valve upstream temperature $T_3$.

The average temperature $T_{ave}$ of the intake passage here is a value higher than the throttle valve upstream temperature $T_3$ and the atmospheric temperature $T_{atm}$, and is lower than the compressor outlet temperature $T_1$.

Figure 6:
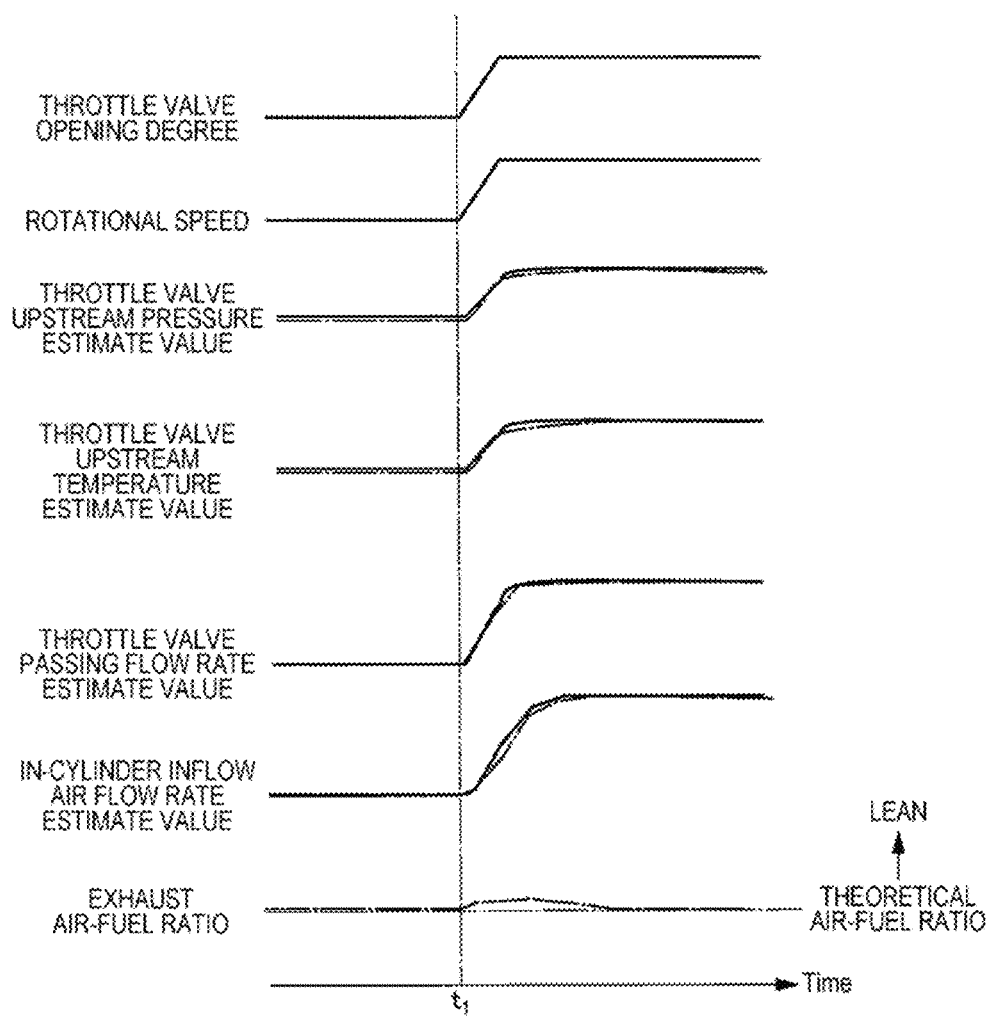
FIG. 6 is a timing chart showing a control example according to the first embodiment of the present invention.

FIG. 6 is a time chart showing an example of an estimate value of the in-cylinder inflow air flow rate calculated by the ECU 40 when the opening degree of the throttle valve changes (opens) at time t1 in the processing configuration of the present embodiment.

A solid line shown in FIG. 6 indicates a true value of each value, and a broken line is an estimate value calculated by the ECU 40.

FIG. 6 shows, in order from the top, a throttle valve opening degree, a rotational speed, a throttle valve upstream pressure estimate value, a throttle valve upstream temperature estimate value, a throttle valve passing flow rate estimate value, an in-cylinder inflow air flow rate estimate value, and an exhaust air-fuel ratio. Only true values are indicated for the throttle valve opening degree and the rotational speed, and both true values and estimate values are indicated from the throttle valve upstream pressure estimate value to the in-cylinder inflow air flow rate estimate value. Only an estimate value is indicated for the exhaust air-fuel ratio, and a state in which the estimate value has changed from a theoretical air-fuel ratio is indicated.

As shown in FIG. 6, in the case of the present embodiment, each estimate value is substantially similar to a true value, and the exhaust air-fuel ratio also only slightly increases from the theoretical air-fuel ratio. Therefore, according to the present embodiment, it is found that the estimation of the in-cylinder inflow air flow rate can be performed with very high accuracy even when the throttle valve opening degree changes.

That is, in the case of the present embodiment, the presence of the spatial distribution estimation unit makes it possible to accurately estimate the throttle valve upstream pressure and temperature at the time of transition. This enables the throttle valve passing flow rate and the in-cylinder inflow air flow rate to be accurately estimated. There is an effect of being able to reduce an estimation error of the in-cylinder inflow air flow rate and being able to suppress a fluctuation of the exhaust air-fuel ratio during transient operation.

Figure 7:
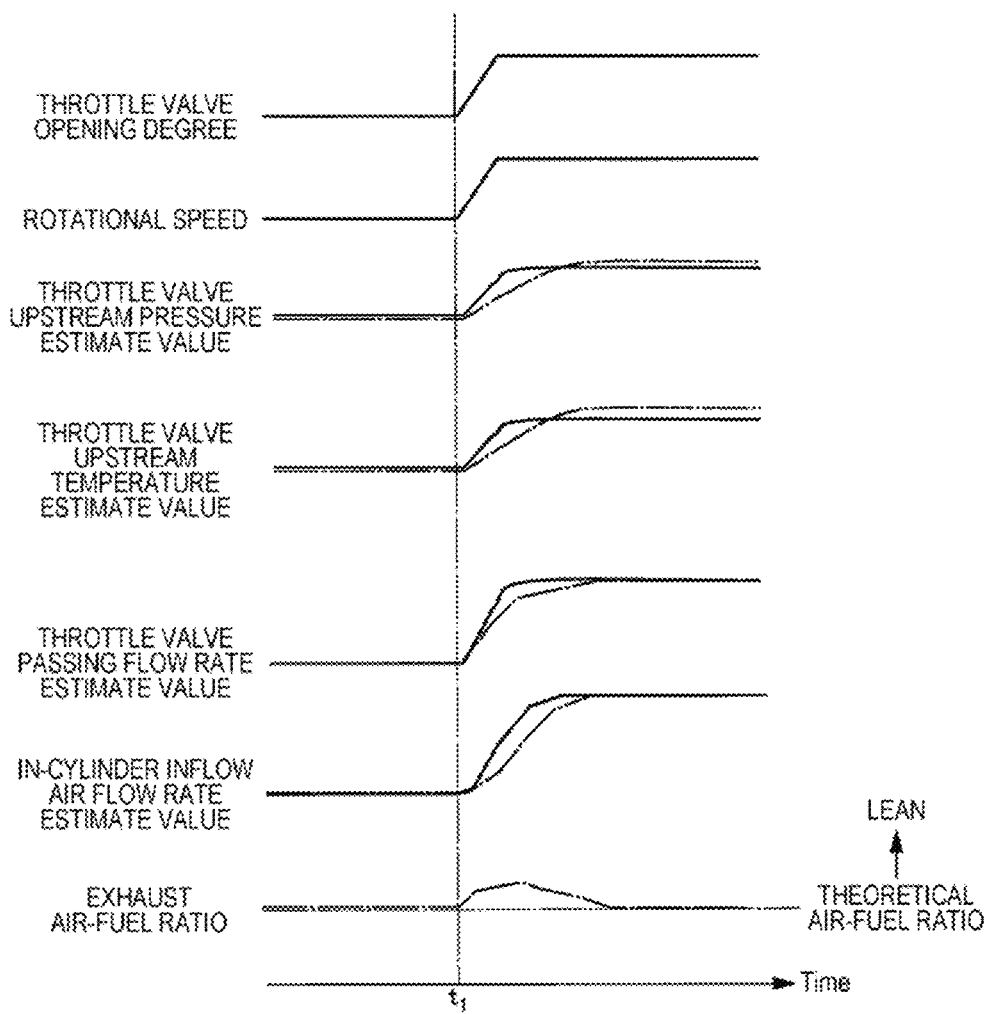
FIG. 7 is a timing chart showing a conventional control example.

FIG. 7 shows, for reference, an example in which each value is estimated by a conventional ECU not provided with the spatial distribution estimation unit 43 of the present embodiment. Change in the throttle valve opening degree is the same in FIGS. 6 and 7, and a true value (solid line) and an estimate value (broken line) of each item are illustrated in the same order FIGS. 6 and 7.

In the case of the conventional example of FIG. 7, the estimate values of the throttle valve upstream pressure estimate value, the throttle valve upstream temperature estimate value, the throttle valve passing flow rate estimate value, and the in-cylinder inflow air flow rate estimate value rise later than the true values. Therefore, the exhaust air-fuel ratio also relatively greatly increases from the theoretical air-fuel ratio.

Effects of Present Embodiment

As described above, according to the present embodiment, the ECU includes the spatial distribution estimation unit and performs the spatial distribution estimation processing, thereby having an effect of being able to accurately estimate the pressure and the temperature spatially distributed in the intake passage without increasing a calculation load in the ECU.

In particular, according to the present embodiment, it is possible to accurately estimate the throttle valve passing flow rate by estimating the throttle valve passing flow rate based on the estimated pressure and temperature of the throttle valve upstream.

The spatial distribution estimation unit estimates the temperature and the pressure at the inlet or the outlet of a constituent element disposed in the intake passage. This can appropriately estimate the pressure and the temperature that change by passing through the constituent element included in the intake passage. That is, the energy is changed by passing through the constituent element included in the intake passage, and the pressure and the temperature are changed. On the other hand, the location where the constituent element that changes the pressure is not disposed in the intake passage is a range where the pressure and the temperature can be regarded as constant. In the range where the pressure and the temperature can be regarded as constant, it is not necessary to estimate the pressure and the temperature in the entire range, and if the state of the gas of the inlet or the outlet of the constituent element is estimated as a representative point, it is possible to appropriately estimate the pressure and the temperature.

Note that in the present embodiment, the temperature and the pressure at the inlet or the outlet of the constituent element are a pressure and a temperature of the gas in a range where the pressure and the temperature can be regarded as constant in the range from a constituent element to a constituent element, and do not indicate only the temperature at the inlet or the outlet of the constituent element.

When the spatial distribution estimation unit estimates the temperature and the pressure, the airflow sensor, the compressor, the intercooler, and the throttle valve, which are arranged in order from the upstream of the intake passage as illustrated in FIG. 1, are used as the constituent elements arranged in the intake passage, whereby there is an effect of being able to appropriately estimate the distributions of the pressure and the temperature in the intake passage. That is, there is an effect of being able to appropriately performing the distributions of the pressure and the temperature in the intake passage in the engine system including the airflow sensor, the compressor, the intercooler, and the throttle valve.

The spatial distribution estimation unit estimates the temperature and the pressure at the compressor outlet, whereby there is an effect of being able to accurately estimate the pressure and the temperature that change by receiving energy from the compressor. That is, by estimating the temperature and the pressure at the compressor outlet, it is possible to estimate the pressure and temperature of the air after the air receives mechanical work from the compressor and changes to a high-temperature and high-pressure state.

By estimating the compressor outlet temperature, which is the temperature between the compressor and the intercooler, from the atmospheric temperature, the atmospheric pressure, and the estimated compressor outlet pressure, it is possible to accurately estimate an actual temperature change as described with reference to FIG. 5.

As described in the flowchart of FIG. 4, the spatial distribution estimation unit can estimate the compressor outlet pressure, which is the pressure between the compressor and the intercooler, based on the mass balance in the intake passage by estimating the compressor outlet pressure from the internal volume of the predetermined intake passage between the constituent elements, the atmospheric pressure, and the intake passage internal average pressure based on the relationship (the relationship described in [Mathematical Formula 12]) that the intake mass of the entire intake passage calculated based on the intake passage internal average pressure, the intake passage internal average temperature, and the entire volume of the predetermined intake passage is equal to the sum of the intake masses of portions in the intake passage calculated based on the pressure between the constituent elements, the intake temperature between the constituent elements, and the internal volume of the predetermined intake passage. Therefore, the compressor outlet pressure can be accurately estimated.

By estimating the temperature and the pressure at the outlet of the intercooler, the spatial distribution estimation unit can estimate the pressure and the temperature that change by the intercooler. That is, by estimating the pressure and the temperature of the air after being changed by the heat exchange with the intercooler and the pressure loss, it is possible to accurately estimate the temperature and the pressure.

The spatial distribution estimation unit can estimate an intercooler outlet pressure in consideration of a pressure loss by obtaining the pressure loss due to the constituent element from the outlet of the compressor to the outlet of the intercooler and estimating the outlet pressure at the intercooler, which is the pressure between the intercooler and the throttle valve, based on the obtained pressure loss. This enables the intercooler outlet pressure to be accurately estimated. Note that the constituent element from the compressor outlet to the intercooler outlet described here indicates, for example, an intake pipe inner wall and the intercooler. The intercooler outlet pressure is a pressure between the intercooler and the throttle valve, and in this range, the pressure can be considered to be uniform. This pressure is calculated in step S104 of the flowchart of FIG. 4.

Based on a relationship that enthalpy calculated based on the intake passage internal average pressure, the intake passage internal average temperature, and an entire volume of the intake passage is equal to a sum of enthalpy calculated based on a pressure between the constituent elements, an intake temperature between the constituent elements, and a predetermined intake passage internal volume, the spatial distribution estimation unit estimates an intercooler outlet temperature, which is a temperature between the intercooler and the throttle valve, from the predetermined intake passage internal volume between the constituent elements, the estimated temperature at the compressor outlet, and the intake passage internal average temperature, thereby being able to estimate the intercooler outlet temperature based on an enthalpy balance in the intake passage. This enables the intercooler outlet temperature to be accurately estimated.

Describing this point in detail, the spatial distribution estimation unit calculates the intercooler outlet temperature based on the enthalpy balance in the intake passage.

As the enthalpy balance in the intake passage, the following mathematical formula is established.

$$C_p T_{ave.} \sum_{i=0}^{3} m_i = \sum_{i=0}^{3} H_i \quad (H_i = m_i C_p T_i) \quad \text{[Mathematical Formula 19]}$$

Here, H [J] is enthalpy, m [kg] is mass, and Cp [J/(kg K)]] is constant pressure specific heat.

Here, for simplification, by arranging [Mathematical Formula 19] on an assumption that the temperature of the gas from the intercooler outlet to the throttle valve is constant, the temperature in the intercooler changes linearly, and the pressure of the gas from the compressor outlet to the throttle valve is constant, the following mathematical formula is obtained.

$$T_{ave.} \sum_{i=0}^{3} \frac{P_i V_i}{T_i} = \sum_{i=0}^{3} P_i V_i \quad \text{[Mathematical Formula 20]}$$

This [Mathematical Formula 20] is developed and arranged for the temperature $T_2$ into a quadratic of $T_2$ shown in the following mathematical formula, and the intercooler outlet temperature can be obtained by the quadratic formula.

$$\left( P_0 V_0 T_1 + P_1 V_1 T_0 - T_0 T_1 / T_{ave.} \sum_{i=0}^{3} P_i V_i \right) T_2^2 + \quad \text{[Mathematical Formula 21]}$$

$$T_1 \left( P_0 V_0 T_1 + P_1 V_1 T_0 + 2 P_1 V_1 T_0 + P_2 V_2 T_0 - \right.$$

$$\left. T_0 T_1 / T_{ave.} \sum_{i=0}^{3} P_i V_i \right) T_2 + P_1 V_1 T_0 T_1^2 = 0$$

This indicates that the intercooler outlet temperature can be estimated based on the enthalpy balance in the intake passage, and the intercooler outlet temperature can be accurately estimated.

By estimating the temperature and the pressure at the throttle valve upstream, the spatial distribution estimation unit can appropriately estimate the pressure and the temperature at the throttle valve upstream. That is, the pressure and the temperature of the air after being changed by the heat exchange and the pressure loss in the intake pipe in the range from the intercooler outlet to the throttle valve are estimated, and the pressure and the temperature of the throttle valve upstream can be appropriately estimated.

By estimating the throttle valve upstream pressure based on the estimated intercooler outlet pressure, the throttle valve upstream pressure can be estimated in consideration of the pressure loss in the pipe from the intercooler outlet to the throttle valve. This is described in [Mathematical Formula 19].

That is, since the temperature change from the intercooler outlet to the throttle valve can be regarded as substantially constant, the intercooler outlet temperature is made the throttle valve upstream temperature. When the intercooler outlet temperature cannot be regarded as the throttle valve upstream temperature, the throttle valve upstream temperature can be calculated by solving the energy balance using a heat exchange model of an intake passage wall surface and a gas. This enables the throttle valve upstream pressure to be accurately estimated.

Also by estimating the throttle valve upstream pressure based on the estimated outlet pressure at the intercooler, the throttle valve upstream pressure can be accurately estimated.

It is possible to accurately estimate the throttle valve upstream pressure based on the estimated intercooler outlet temperature.

The throttle valve passing flow rate can be accurately estimated by including the throttle valve passing flow rate estimation unit 44 that estimates or detects a pressure at a throttle valve downstream and, based on an estimated throttle valve upstream pressure, an estimated throttle valve upstream temperature, a throttle valve downstream pressure, and a throttle valve opening degree, estimates a throttle valve passing flow rate.

The estimation of the throttle valve passing flow rate in this throttle valve passing flow rate estimation unit 44 is performed in the processing described in [Mathematical Formula 7], and is performed by the calculation of step S108 of the flowchart of FIG. 4.

The in-cylinder inflow air flow rate can be accurately estimated and the fuel injection quantity can be calculated by including the in-cylinder inflow air flow rate estimation unit 45 that estimates an in-cylinder inflow air flow rate based on the throttle valve passing flow rate estimated by the throttle valve passing flow rate estimation unit, and the fuel injection quantity calculation unit 46 that calculates a fuel injection quantity based on an in-cylinder inflow air flow rate estimated by the in-cylinder inflow air flow rate estimation unit 45.

Here, an example of processing performed by the in-cylinder inflow air flow rate estimation unit 45 and the fuel injection quantity calculation unit 46 will be described. An intake pipe mass $m_{mani}$ is calculated by the following mathematical formula in which [Mathematical Formula 1] is discretized based on the throttle valve passing flow rate dGThr, a previous value of an in-cylinder inflow air flow rate $dG_{cyl}$, and a previous value of an intake pipe mass.

$$m_{mani}(n) = (dG_{Thr}(n) - dG_{cyl}(n-1)) \times \quad \text{[Mathematical Formula 22]}$$

$$dt + m_{mani}(n-1)$$

An intake pipe energy is calculated by the following mathematical formula in which [Mathematical Formula 2] is discretized based on the intake pipe mass $m_{mani}$, the throttle valve upstream temperature $T_3$, a previous value of an intake pipe temperature $T_{mani}$, the throttle valve passing flow rate $dG_{Thr}$, and a previous value of the in-cylinder inflow air flow rate $dG_{cyl}$.

$$e_{mani}(n) = \left(\frac{\kappa_{Thr} R_{Thr}}{\kappa_{Thr} - 1} T_{Thr} \cdot dG_{Thr}(n) - \right. \quad \text{[Mathematical Formula 23]}$$

$$\left. \frac{\kappa_{mani} R_{mani}}{\kappa_{mani} - 1} T_{mani} \cdot dG_{cyl}(n-1) - \frac{dQ}{dt}\right) \times$$

$$dt + e_{mani}(n-1)$$

Here, for the specific heat ratio and the gas constant, values of air in a standard state are used as representative values. A wall surface heat loss amount is experimentally obtained in advance to be given as a constant.

The intake pipe temperature is calculated by [Mathematical Formula 4] based on the intake pipe energy. The intake pipe pressure is calculated by [Mathematical Formula 3] based on the intake pipe temperature and the intake pipe mass. Note that in a case of including a device that detects the intake pipe pressure, it is also possible to use a detection value thereof.

[Mathematical Formula 24] shows a calculation mathematical formula of the in-cylinder inflow air flow rate.

$$dG_{cyl} = \eta \times Ne \times Vs \times \frac{n_{cyl}}{120} \times \frac{P_{mani}}{RT_{mani}} \quad \text{[Mathematical Formula 24]}$$

Here, $dG_{cyl}$ is an in-cylinder inflow air flow rate [kg/s], $\eta$ is intake efficiency, Ne is an engine rotational speed [rpm], Vs is a stroke volume [$m^3$], $P_{mani}$ is throttle valve downstream pressure [Pa], $T_{mani}$ is intake pipe temperature [K], and ncyl is the number of cylinders.

Note that the intake efficiency is adapted in advance, and is set in advance so that the intake efficiency can be searched from the engine rotational speed, the intake pipe pressure, the intake valve phase, and the exhaust valve phase.

The fuel injection quantity can be calculated based on the in-cylinder inflow air flow rate and the target air-fuel ratio.

Second Embodiment

Figure 8:
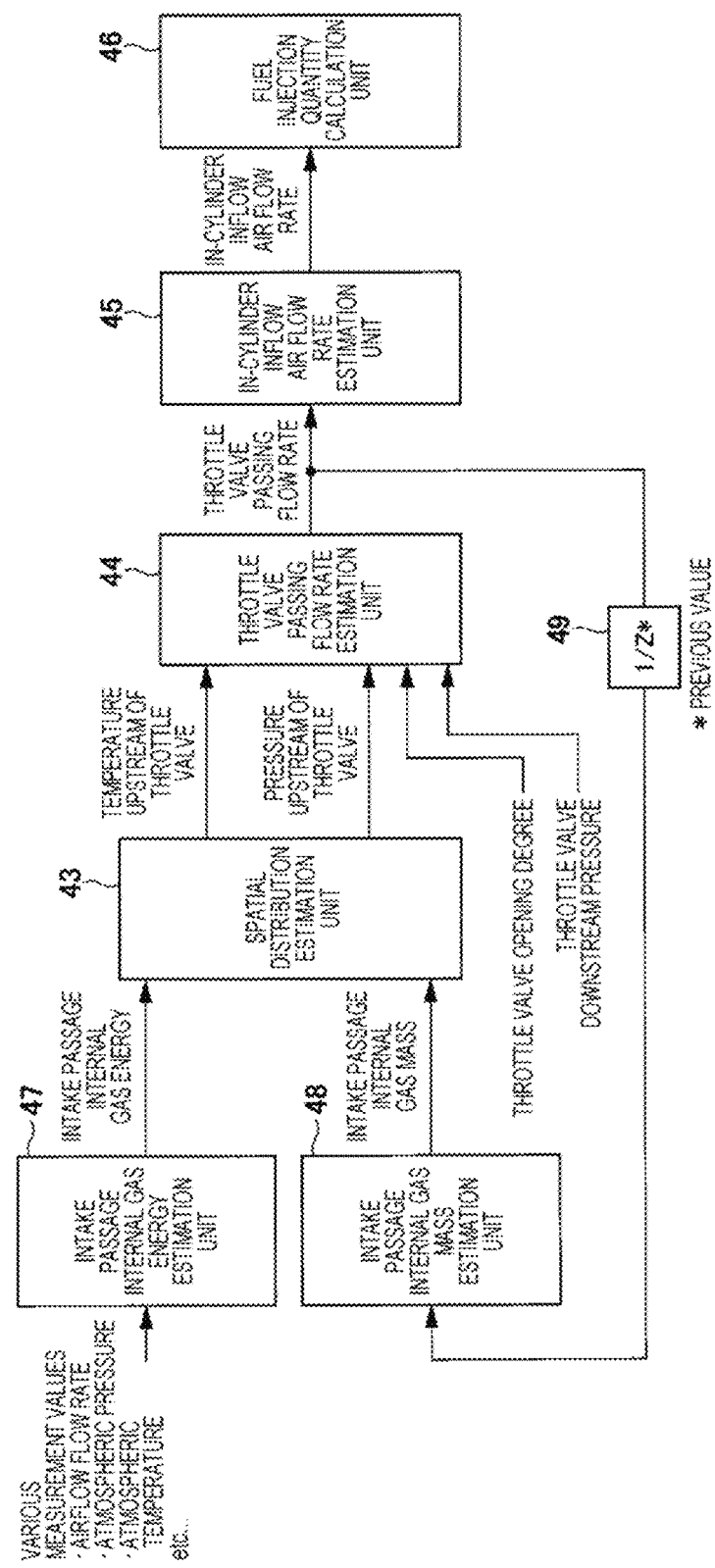
FIG. 8 is a functional block diagram of a control device for an internal combustion engine according to a second embodiment of the present invention.

Next, a control device for an internal combustion engine according to the second embodiment of the present invention will be described with reference to FIGS. 8 and 9. In FIGS. 8 and 9 describing the second embodiment, parts corresponding to FIGS. 1 to 7 described in the first embodiment are denoted by the identical reference signs, and redundant description is omitted.

In the second embodiment, the configuration of the internal combustion period (engine) to be controlled and the hardware configuration of the ECU 40, which is a control device, are the same as those described in the first embodiment, and the control processing of the internal combustion engine performed by the control device is different from that in the first embodiment.

[Configuration for Performing Control Processing by ECU]

FIG. 8 illustrates a functional configuration for performing the control processing of the engine 100 by the ECU 40 according to the present embodiment. The processing units illustrated in FIG. 8 are configured in the work memory in the CPU 40e by execution of the control program mounted on the ECU 40.

As illustrated in FIG. 8, the ECU 40 includes an intake passage internal gas energy estimation unit 47, an intake passage internal gas mass estimation unit 48, and a calculation unit 49. The ECU 40 includes the spatial distribution estimation unit 43, the throttle valve passing flow rate estimation unit 44, the in-cylinder inflow air flow rate estimation unit 45, and the fuel injection quantity calculation unit 46 described with reference to FIG. 3.

The intake passage internal gas energy estimation unit 47 is supplied with the detection signal Ss3 of the intake flow rate, the detection signal Ss16 of the atmospheric pressure, the detection signal Ss15 of the atmospheric temperature, and the like. The atmospheric pressure and the atmospheric temperature may be estimate values in place of detection values of the sensors.

The intake passage internal gas energy estimation unit 47 estimates gas energy in the intake passage based on these values. The gas energy estimated here is a gas energy in the intake passage having a region up to the throttle valve as one region. The estimated gas energy in the intake passage is supplied to the spatial distribution estimation unit 43.

The intake passage internal gas mass estimation unit 48 is supplied with a value calculated based on the previous throttle valve passing flow rate obtained by the calculation unit 49, and estimates the gas mass in the intake passage. The gas mass estimated here is a mass in the intake passage having a region up to the throttle valve as one region. The estimated intake passage internal gas mass is supplied to the spatial distribution estimation unit 43.

Based on the intake passage internal gas mass, the intake passage internal gas energy, and a model of energy change caused by a constituent element included in the intake passage, the spatial distribution estimation unit 43 estimates a spatially distributed pressure (throttle valve upstream pressure) and temperature (throttle valve upstream temperature).

This can estimate the pressure and the temperature distributed in the intake passage in consideration of the energy change by the constituent element included in the intake passage. Since up to the throttle valve of the intake passage is handled as one region, it is not necessary to increase a calculation region, and it is possible to suppress an increase in the calculation load.

Then, the throttle valve upstream pressure and the throttle valve upstream temperature estimated by the spatial distribution estimation unit 43 are supplied to the throttle valve passing flow rate estimation unit 44. The throttle valve passing flow rate estimation unit 44 is supplied with information on a throttle valve opening degree and a downstream pressure of the throttle valve.

The configuration in and after the throttle valve passing flow rate estimation unit 44 is the same as the configuration described in FIG. 3. That is, the throttle valve passing flow rate is estimated by the throttle valve passing flow rate estimation unit 44, and the throttle valve passage flow estimated by the throttle valve passing flow rate estimation unit 44 is supplied to the in-cylinder inflow air flow rate estimation unit 45.

The in-cylinder inflow air flow rate estimation unit 45 estimates the air quantity flowing into the cylinder (combustion chamber 13) from the throttle valve passing flow rate, and the in-cylinder inflow air quantity estimated by the in-cylinder inflow air flow rate estimation unit 45 is supplied to the fuel injection quantity calculation unit 46.

The fuel injection quantity calculation unit 46 calculates the fuel injection quantity based on the in-cylinder inflow air quantity, and generates the fuel injection device drive signal Ds10 corresponding to the calculated fuel injection quantity.

[Mechanism of Processing According to Present Embodiment]

Next, a mechanism in which processing is performed in the configuration illustrated in FIG. 8 will be described.

First, the ECU 40 calculates the compressor outlet pressure based on a mass balance in the intake passage. As the mass balance in the intake passage, the following mathematical formula is established.

$$m_{Thr} = \sum_{i=0}^{3} \frac{P_i V_i}{T_i} \quad \text{[Mathematical Formula 25]}$$

In [Mathematical Formula 25], m [kg] represents mass, P [Pa] represents pressure, T [K] represents temperature, V [m³] represents volume, an index Thv represents inside the intake passage, 0 represents a range from an airflow sensor downstream to the compressor inlet, 1 represents a range from the compressor outlet to the intercooler inlet, 2 represents the intercooler, and 3 represents a range from the intercooler outlet to the throttle valve.

Here, for simplification, by arranging [Mathematical Formula 25] for $P_1$ on an assumption that the pressure from the compressor outlet to the throttle valve upstream is constant, the following mathematical formula is obtained.

$$P_1 = \frac{m_{Thr} - \frac{P_0 V_0}{T_0}}{\sum_{i=1}^{3} \frac{V_i}{T_i}} \quad \text{[Mathematical Formula 26]}$$

By using $m_{Thv}$ as an estimate value, $P_0$ as an atmospheric pressure sensor detection value, $T_0$ as an atmospheric temperature sensor detection value, $V_i$ as a design value, and $T_i$ as a previous value of the estimate value, the compressor outlet pressure can be obtained from [Mathematical Formula 26].

With this calculation, estimation of the intake passage internal average pressure is no longer necessary, and the calculation load can be reduced.

Next, a mechanism that estimates the intercooler outlet temperature will be described.

Here, the intercooler outlet temperature is calculated based on the enthalpy balance in the intake passage.

As the enthalpy balance in the intake passage, the following mathematical formula is established.

$$m_{Thv} e_{Thv} = \sum_{i=0}^{3} H_i \quad (H_i = m_i C_p T_i) \quad \text{[Mathematical Formula 27]}$$

In [Mathematical Formula 27], e [J] is energy, H [J] is enthalpy, m [kg] is mass, and Cp [J/(kg K)]] is constant pressure specific heat.

Here, for simplification, on an assumption that the temperature of the gas from the intercooler outlet to the throttle valve is constant, the temperature in the intercooler changes linearly, and the pressure of the gas from the compressor outlet to the throttle valve is constant, the following mathematical formula is obtained.

$$e_{Thv} \sum_{i=0}^{3} \frac{P_i V_i}{T_i} = C_p \sum_{i=0}^{3} P_i V_i \quad \text{[Mathematical Formula 28]}$$

This [Mathematical Formula 28] is developed and arranged for the intercooler outlet temperature $T_2$, into a quadratic of $T_2$ shown in the following mathematical formula. The intercooler outlet temperature $T_2$ can be obtained by the quadratic formula.

$$\left[P_1 V_1 - T_1 \left(\frac{C_p}{e} \sum_{i=0}^{3} P_i V_i - \frac{P_0 V_0}{T_0}\right)\right] T_2^2 +$$

$$T_1 \left[P_1 (V_1 + 2V_2 + V_3) - \right.$$

$$\left. T_1 \left(\frac{C_p}{e} \sum_{i=0}^{3} P_i V_i - \frac{P_0 V_0}{T_0}\right)\right] T_2 + P_1 V_3 T_1^2 = 0 \quad \text{[Mathematical Formula 29]}$$

Since the intercooler outlet temperature $T_2$ is obtained in this manner, estimation of the intake passage internal average temperature is no longer necessary, and the calculation load can be reduced.

[Control Processing by ECU]

FIG. 9 is a flowchart showing control processing of the engine 100 by the ECU 40 of the present embodiment.

First, the ECU 40 calculates an intake passage average mass $m_{Thv}$ and an intake passage internal gas energy $e_{Thv}$ (step S201).

In step S201, the following [Mathematical Formula 29] and [Mathematical Formula 30] are calculated to calculate the intake passage average mass $m_{Thv}$ and the intake passage internal gas energy $e_{Thv}$.

$$m_{Thr}(n) = \quad \text{[Mathematical Formula 30]}$$

$$(dG_{AFS}(n) - dG_{Thr}(n-1)) \times dt + m_{Thr}(n-1)$$

$$e_{Thr}(n) = \left(\frac{\kappa R}{\kappa - 1} T_0(n) \cdot dG_{AFS}(n) - \right. \quad \text{[Mathematical Formula 31]}$$

$$\left. \frac{\kappa R}{\kappa - 2} T_3(n-1) \cdot dG_{Thr}(n-1) - \frac{dQ_c}{dt}\right) \times$$

$$dt + e_{Thr}(n-1)$$

Next, the ECU 40 calculates the compressor outlet pressure $P_1$ (step S202). Here, the following [Mathematical Formula 32] is calculated to obtain the compressor outlet pressure $P_1$.

$$P_1(n) = \frac{m_{Thr}(n) - \frac{P_0(n) V_0}{T_0}}{\sum_{i=1}^{3} \frac{V_i}{T_i(n-1)}} \quad \text{[Mathematical Formula 32]}$$

Furthermore, the ECU 40 calculates the compressor outlet temperature $T_1$ (step S203), and subsequently calculates the intercooler outlet pressure $P_2$ (step S204). The calculation in step S203 and step S204 is the same as the calculation in step S103 and step S104 in the flowchart of FIG. 4, and the description will be omitted.

Next, the ECU 40 calculates the intercooler outlet temperature $T_2$ (step S205). Here, in calculating the intercooler outlet temperature $T_2$, coefficients a, b, and c are calculated by the following [Mathematical Formula 32], [Mathematical Formula 33], and [Mathematical Formula 34], respectively. $P_2(n)$ and $P_3(n)$ are calculated as $P_1(n)$.

$$a = P_1(n) V_1 - \qquad \text{[Mathematical Formula 33]}$$

$$T_1(n)\left(\frac{C_p}{e(n)}\sum_{i=0}^{3} P_i(n) V_i - \frac{P_0(n) V_0}{T_0(n)}\right)$$

$$b = T_1(n)\left[P_1(n)(V_1 + 2V_2 + V_3) - \qquad \text{[Mathematical Formula 34]} \right.$$

$$\left. T_1(n)\left(\frac{C_p}{e(n)}\sum_{i=0}^{3} P_i(n) V_i - \frac{P_0(n) V_0}{T_0(n)}\right)\right]$$

$$P_1(n) V_3 T_1^2(n) \qquad \text{[Mathematical Formula 35]}$$

Then, the intercooler outlet pressure $P_2$ is calculated by the quadratic formula as described below.

$$T_2(n) = \frac{-b + \sqrt{b^2 - 4ac}}{2a} \qquad \text{[Mathematical Formula 36]}$$

Next, the ECU 40 calculates the throttle valve upstream pressure $P_3$ (step S206). The ECU 40 calculates the throttle valve upstream temperature $T_3$ (step S207). Furthermore, the ECU 40 calculates the throttle valve passing air flow rate (step S208). The processing of step S206, step S207, and step S208 is the same as the processing of step S106, step S107, and step S108 of the flowchart of FIG. 4, and the description will be omitted.

Effects of Present Embodiment

As described above, also in the present embodiment, the ECU includes the spatial distribution estimation unit and performs the spatial distribution estimation processing, thereby having an effect of being able to accurately estimate the pressure and the temperature spatially distributed in the intake passage without increasing a calculation load in the ECU.

In the case of the present embodiment, estimation of the intake passage internal average pressure is no longer necessary, and the calculation load can be reduced.

Modifications

Note that the present invention is not limited to the above-described embodiments, and includes various modifications. For example, the above-described embodiments have been described in detail in order to describe the present invention in an easy-to-understand manner, and are not necessarily limited to those having all the described configurations.

In the block diagrams of FIGS. 2, 3, and 8, only control lines and information lines considered to be necessary for description are illustrated, and signal lines and information lines necessary for a product are not necessarily illustrated. In practice, it may be considered that almost all the configurations are interconnected.

Information such as programs, tables, and files that implement functions performed by the ECU, which is the control device, can be stored in various recording media such as a memory, a hard disk, a solid state drive (SSD), an IC card, and an SD card optical disk.

REFERENCE SIGNS LIST 1 accelerator opening degree sensor
3 intake flow rate sensor (airflow sensor)
4a turbine
4b compressor
5 intercooler
6 throttle valve
6a throttle position sensor
8 intake pipe
9 variable valve
9a variable intake valve
9b variable exhaust valve
10 fuel injection device
11 ignition plug
12 crank angle sensor
13 combustion chamber
14 exhaust pipe
15 intake temperature sensor
16 atmospheric pressure sensor
20 air-fuel ratio sensor
21 catalyst converter
30 EGR cooler
31 EGR valve
32 EGR pipe
40 engine control unit (ECU)
40a input circuit
40b input/output port
40c random access memory (RAM)
40d read only memory (ROM)
40e central processing unit (CPU)
40f throttle drive circuit
40g EGR valve drive circuit
40h variable valve mechanism drive circuit
40i fuel injection device drive circuit
40j ignition output circuit
41 intake passage internal average temperature estimation unit
42 intake passage internal average pressure estimation unit
43 spatial distribution estimation unit
44 throttle valve passing flow rate estimation unit
44a throttle valve downstream pressure acquisition unit
45 in-cylinder inflow air flow rate estimation unit
46 fuel injection quantity calculation unit
47 intake passage internal gas energy estimation unit
48 intake passage internal gas mass estimation unit
49 calculation unit
100 engine

The invention claimed is:
1. A control device for an internal combustion engine, comprising:
an intake air flow rate acquisition unit that detects an intake air flow rate into an intake passage;
an atmospheric pressure acquisition unit that estimates or detects a pressure of atmosphere;
an atmospheric temperature acquisition unit that estimates or detects a temperature of atmosphere;
an intake passage internal average pressure estimation unit that estimates an intake passage internal average pressure in an intake passage having a region up to a throttle valve of the intake passage as one region;
an intake passage internal average temperature estimation unit that estimates an intake passage internal average temperature in a passage having a region up to a throttle valve of the intake passage as one region; and a spatial distribution estimation unit that estimates distributions of pressure and temperature inside the intake passage based on an intake passage internal average pressure estimated by the intake passage internal average pressure estimation unit, an intake passage internal average temperature estimated by the intake passage internal average temperature estimation unit, and a model of energy change caused by a constituent element included in the intake passage.

2. The control device for an internal combustion engine according to claim 1, wherein the spatial distribution estimation unit estimates a temperature and a pressure at an inlet or an outlet of the constituent element.

3. The control device for an internal combustion engine according to claim 1, wherein the constituent element includes an airflow sensor, a compressor, an intercooler, and a throttle valve, which are disposed in order from an upstream of an intake passage.

4. The control device for an internal combustion engine according to claim 3, wherein the spatial distribution estimation unit estimates a temperature and a pressure at an outlet of the compressor.

5. The control device for an internal combustion engine according to claim 4, wherein the spatial distribution estimation unit estimates a temperature at the outlet of the compressor, which is a temperature between the compressor and the intercooler, from the atmospheric temperature, the atmospheric pressure, and the estimated pressure at the outlet of the compressor.

6. The control device for an internal combustion engine according to claim 4, wherein based on a relationship that an intake mass of an entire intake passage calculated based on the intake passage internal average pressure, the intake passage internal average temperature, and an entire volume of a predetermined intake passage is equal to a sum of intake masses of portions in an intake passage calculated based on a pressure between the constituent elements, an intake temperature between the constituent elements, and an internal volume of a predetermined intake passage, the spatial distribution estimation unit estimates a compressor outlet pressure, which is a pressure between the compressor and the intercooler, from the internal volume of the predetermined intake passage between the constituent elements, the atmospheric pressure, and the intake passage internal average pressure.

7. The control device for an internal combustion engine according to claim 3, wherein the spatial distribution estimation unit estimates a temperature and a pressure at an outlet of the intercooler.

8. The control device for an internal combustion engine according to claim 3, wherein the spatial distribution estimation unit obtains a pressure loss by a constituent element from an outlet of the compressor to an outlet of the intercooler, and estimates an outlet pressure at the intercooler, which is a pressure between the intercooler and the throttle valve, based on the obtained pressure loss.

9. The control device for an internal combustion engine according to claim 3, wherein based on a relationship that enthalpy calculated based on the intake passage internal average pressure, the intake passage internal average temperature, and an entire volume of the intake passage is equal to a sum of enthalpy calculated based on a pressure between the constituent elements, an intake temperature between the constituent elements, and a predetermined intake passage internal volume, the spatial distribution estimation unit estimates an intercooler outlet temperature, which is a temperature between the intercooler and the throttle valve, from the predetermined intake passage internal volume between the constituent elements, the estimated temperature at the compressor outlet, and the intake passage internal average temperature.

10. The control device for an internal combustion engine according to claim 3, wherein the spatial distribution estimation unit estimates a temperature and a pressure at an upstream of the throttle valve.

11. The control device for an internal combustion engine according to claim 3, wherein a throttle valve upstream pressure is estimated based on an outlet pressure at the intercooler having been estimated, and a throttle valve upstream temperature is estimated based on an intercooler outlet temperature having been estimated.

12. The control device for an internal combustion engine according to claim 3, comprising a throttle valve passing flow rate estimation unit that estimates or detects a pressure at a throttle valve downstream and, based on an estimated throttle valve upstream pressure, an estimated throttle valve upstream temperature, a throttle valve downstream pressure, and a throttle valve opening degree, estimates a throttle valve passing flow rate.

13. The control device for an internal combustion engine according to claim 12, comprising:
an in-cylinder inflow air flow rate estimation unit that estimates an in-cylinder inflow air flow rate based on the throttle valve passing flow rate estimated by the throttle valve passing flow rate estimation unit; and
a fuel injection quantity calculation unit that calculates a fuel injection quantity based on an in-cylinder inflow air flow rate estimated by the in-cylinder inflow air flow rate estimation unit.

14. A control device for an internal combustion engine, comprising:
an intake passage internal gas mass estimation unit that estimates a mass of a gas in an intake passage having a region up to a throttle valve of an intake passage as one region;
an intake passage internal gas energy estimation unit that estimates an energy of a gas in an intake passage having a region up to a throttle valve of an intake passage as one region; and
a spatial distribution estimation unit that estimates distributions of a pressure and a temperature based on an intake passage internal gas mass estimated by the intake passage internal gas mass estimation unit, and an intake passage internal gas energy estimated by the intake passage internal gas energy estimation unit, and a model of energy change caused by a constituent element included in an intake passage.

15. A control method for an internal combustion engine, comprising:
intake air flow rate acquisition processing of detecting an intake air flow rate into an intake passage;
atmospheric pressure acquisition processing of estimating or detecting a pressure of atmosphere;
atmospheric temperature acquisition processing of estimating or detecting a temperature of atmosphere;
intake passage internal average pressure estimation processing of estimating an intake passage internal average pressure in an intake passage having a region up to a throttle valve of the intake passage as one region;
an intake passage internal average temperature estimation processing of estimating an intake passage internal average temperature in an intake passage having a region up to a throttle valve of the intake passage as one region; and spatial distribution estimation processing of estimating distributions of pressure and temperature inside the intake passage based on an intake passage internal average pressure estimated by the intake passage internal average pressure estimation processing, an intake passage internal average temperature estimated by the intake passage internal average temperature estimation processing, and a model of energy change caused by a constituent element included in the intake passage.

* * * * *